United States Patent
Ruiz Muñoz

(10) Patent No.: US 8,433,684 B2
(45) Date of Patent: Apr. 30, 2013

(54) MANAGING DATA BACKUP OF AN IN-MEMORY DATABASE IN A DATABASE MANAGEMENT SYSTEM

(75) Inventor: Carlos Ruiz Muñoz, Madrid (ES)

(73) Assignee: Sybase, Inc., Dublin, CA (US)

( * ) Notice: Subject to any disclaimer, the term of this patent is extended or adjusted under 35 U.S.C. 154(b) by 136 days.

(21) Appl. No.: 12/816,233

(22) Filed: Jun. 15, 2010

(65) Prior Publication Data

US 2011/0246425 A1    Oct. 6, 2011

(30) Foreign Application Priority Data

Mar. 30, 2010  (ES) .................................. 201030484

(51) Int. Cl.
*G06F 17/30*  (2006.01)

(52) U.S. Cl.
USPC ................................... 707/649; 707/999.204

(58) Field of Classification Search .................. None
See application file for complete search history.

(56) References Cited

U.S. PATENT DOCUMENTS

| 6,728,840 | B1 | 4/2004 | Shatil et al. |
| 2004/0010502 | A1* | 1/2004 | Bomfim et al. ............... 707/100 |
| 2008/0222111 | A1 | 9/2008 | Hoang et al. |
| 2011/0041006 | A1* | 2/2011 | Fowler ............................ 714/10 |

OTHER PUBLICATIONS

Sybase, Inc., Final Evaluation Report SQL Server Version 11.0.6 and Secure SQL Server Version 11.0.6, Mar. 1997, pp. 66-70.*
Non-Final Rejection mailed May 9, 2012 for U.S. Appl. No. 12/726,063, filed Mar. 17, 2010; 11 pages.
Final Rejection mailed Oct. 31, 2012 for U.S. Appl. No. 12/726,063, filed Mar. 17, 2010, 11 pages.

* cited by examiner

*Primary Examiner* — Anteneh Girma
(74) *Attorney, Agent, or Firm* — Sterne, Kessler, Goldstein & Fox P.L.L.C.

(57) ABSTRACT

System, method, computer program product embodiments and combinations and sub-combinations thereof for backing up an in-memory database. In an embodiment, a backup server is provided to perform backup operations of a database on behalf of a database server. A determination is made as to whether the database is an in-memory database. Database server connections are utilized during data accesses for the backup operations when the database is an in-memory database.

14 Claims, 8 Drawing Sheets

MANAGING DATA BACKUP OF AN IN-MEMORY DATABASE IN A DATABASE MANAGEMENT SYSTEM

CROSS REFERENCE TO RELATED APPLICATIONS

This application claims the benefit of Spanish Application No. P201030484, filed Mar. 30, 2010, and entitled "GESTION DE COPIAS DE SEGURIDAD DE DATOS DE UNA BASE DE DATOS RESIDENTE EN MEMORIA DE UN SISTEMA DE GESTION DE BASES DE DATOS," which is herein incorporated by reference in its entirety.

BACKGROUND

1. Field of the Invention

The present invention relates to database management systems and, more particularly, to a system and methodology for managing data backup of an in-memory database fully integrated in a traditional disk-resident database management system.

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

Of concern for robust operations with a database is the ability to achieve data backup. Database management systems typically include archive functionality enabling a user to save the data from the database to an archive system or device, such as tape. The archive can be used to restore the database (e.g., in the event the database is corrupted or damaged). This archive functionality can also be used for purposes of migrating a database from a first or "source" machine to a second or "target" machine (e.g., in the event the user wants to change the machine on which the database is used). An example of data backup operations for disk-based databases is provided in U.S. Pat. No. 5,671,350, assigned to assignee of the present invention.

In operation, a DBMS frequently needs to retrieve data from or persist data to storage devices such as disks, such as during backup operations. Unfortunately, access to disk-based storage devices can be somewhat slow. In general, support of faster database performance by the running of an entire database fully in-memory (e.g., RAM) without any on-disk storage and integrated tightly with the Database Server engine is considered desirable. Some software components, such as SolidDB from IBM Corporation (Armonk, N.Y.) or TimesTen from Oracle Corporation (Redwood City, Calif.), are available to provide some level of support of an in-memory database as stand-alone products operating as an add-on to the operations of the Database Server. However, while potentially achieving better database performance, a need remains for a backup solution for in-memory databases.

The present invention provides a solution for these and other needs.

BRIEF SUMMARY

Briefly stated, the invention includes system, method, computer program product embodiments and combinations and sub-combinations thereof for backing up an in-memory database. In an embodiment, a backup server is provided to perform backup operations of a database on behalf of a database server. A determination is made as to whether the database is an in-memory database. Database server connections are utilized during data accesses for the backup operations when the database is an in-memory database.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
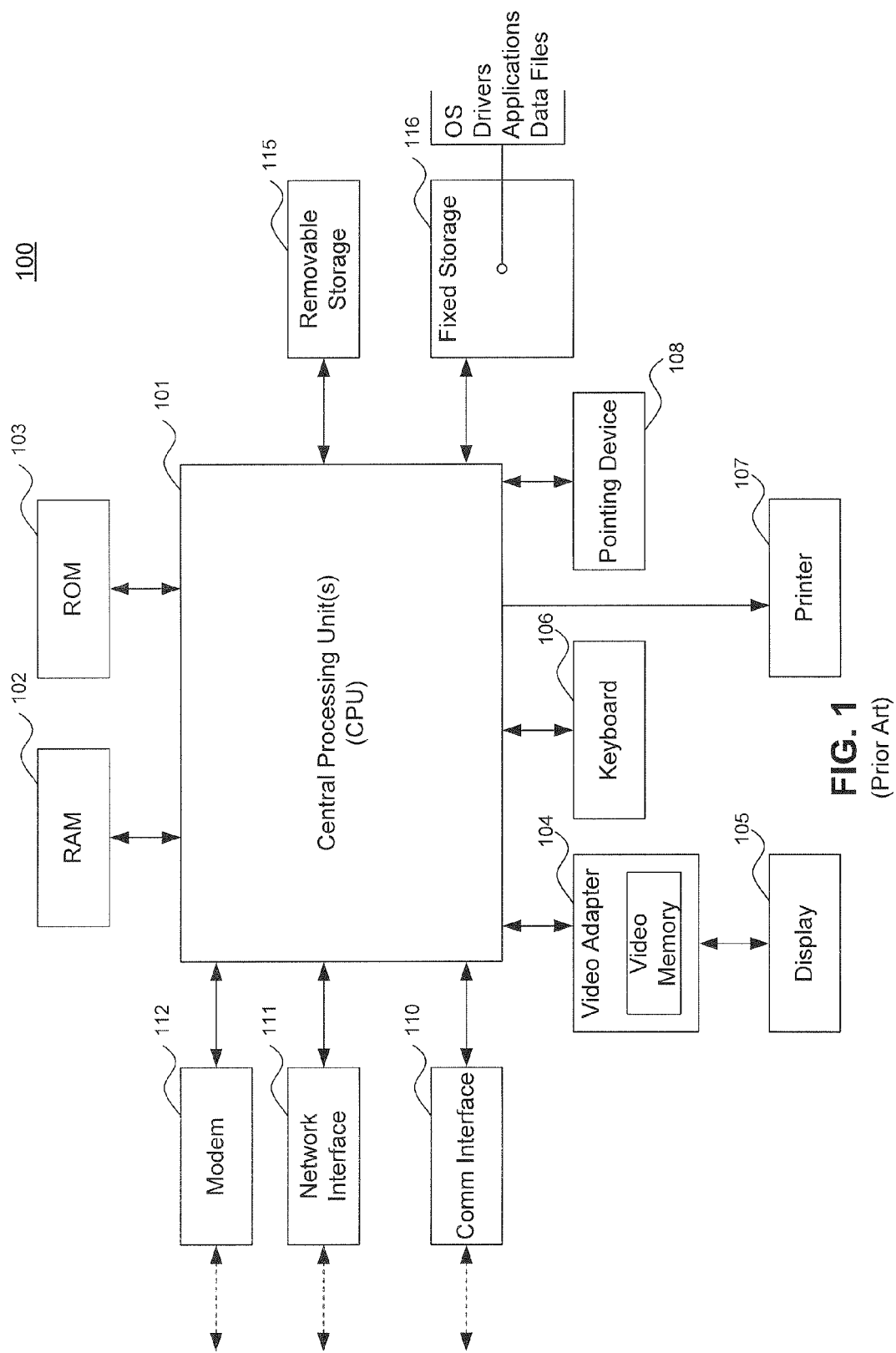
FIG. 1 illustrates a very general block diagram of a computer system (e.g., an IBM-compatible system) in which software-implemented processes of the present invention may be embodied.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for providing methodology for providing an in-memory database fully integrated in a traditional disk-resident database management system.

GLOSSARY

The following definitions are offered for purposes of illustration, not limitation, in order to assist with understanding the discussion that follows.

Cache: a cache is a section of relatively faster memory (e.g., RAM) allocated to temporarily store data objects so as to provide faster access to such objects (e.g., when compared to access of such objects from disk).

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 907541-5)-1999 (formerly ANSI/ISO/IEC 9075-(1-5)1999), the disclosure of which is hereby incorporated by reference.

IMDB: In-Memory database, a zero-disk footprint database which is hosted entirely in-memory in the buffer cache. No disk device is required to create and use such a database. In-Memory databases are described in greater detail in U.S. Provisional Patent Application No. 61/266,313, filed on Dec. 3, 2009, and U.S. patent application Ser. No. 12/726,063, filed on Mar. 17, 2010, both entitled "Managing Data Storage as an In-Memory Database in a Database Management System," which are incorporated by reference herein in their entireties.

Named Cache: an area of memory that contains the in-memory images of database pages, as well as the data structures required to manage the pages. Each has a unique name which is used for configuration purpose. It may not be contiguous in the memory and might be portioned into multiple sub caches ('cache partition').

In-memory Storage Cache: a named cache in an IMDB with a specified cache type (e.g., 'inmemory_storage') being used to host the entire database, and effectively turning off I/O to disk during run-time operations of the server. Other buffer manager strategies like buffer grabbing, washing and replacement are also turned off for an in-memory storage cache.

In-memory device: A virtual device created over the in-memory storage cache that has similar information like disk devices but resides in the memory.

RPC: Remote Procedure Call which is a service that allows one process to call a software procedure in another process. The processes may be running on separate machines.

Cache Device: a device created on named cache used by an in-memory database.

Dump: Making a backup of a database, including the data and the transaction log. This action may take two forms: a "database dump," which includes all the database's data and its transaction log (using the dump database command), or a "transaction log dump," which includes the database's transaction log but not its data (using the dump transaction command). A transaction log dump also removes records from the transaction log, making more log space.

Dump device: A single tape, partition, file or third party storage system used for a database or transaction dump. A dump can span many devices, or many dumps can be made to a single tape volume.

Load: To restore data stored in a backup created during a dump.

Runlist: A set of contiguous database pages that are copied in a single dump operation.

ct-lib: Client-Library, a programming interface component of Open Client that provides a collection of routines for use in writing client applications. Functions provided by the library include ones to establish a connection to the server.

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the MICROSOFT™ Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, MICROSOFT™ Windows NT, MICROSOFT™ Windows 2000, MICROSOFT™ Windows XP, or MICROSOFT™ Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Figure 2:
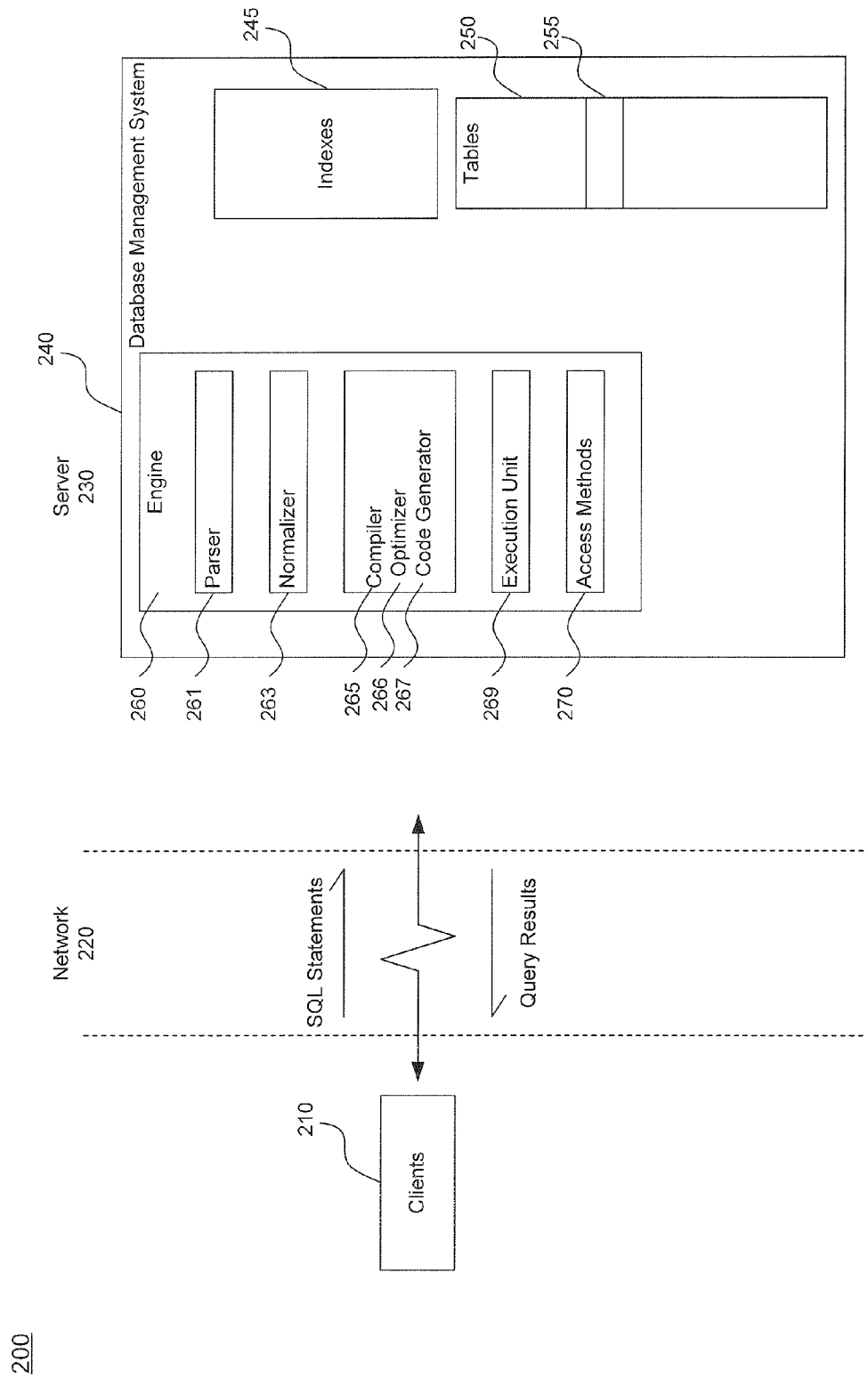
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a Database Server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a MICROSOFT™ Windows client operating system (e.g., MICROSOFT™ Windows 95/98, Windows 2000, or Windows XP).

The Database Server system 240, which comprises Sybase™ Adaptive Server™ Enterprise (ASE, available from Sybase, Inc. of Dublin, Calif.) in an exemplary embodiment, generally operates as an independent process (i.e., independently of the clients), running under a server operating system such as MICROSOFT™ Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the Database Server system 240.

Client/server environments, Database Servers, and networks are well documented in the technical, trade, and patent literature. For a discussion of Sybase™-branded Database Servers and client/server environments generally, see, e.g., Nath, A., "The Guide to SQL Server", Second Edition, Addison-Wesley Publishing Company, 1995. For a description of Sybase™ Adaptive Server™ Enterprise, see, e.g., "Adaptive Server Enterprise 15.0" documentation set from Sybase, Inc. of Dublin, Calif. This product documentation is available via the Internet (e.g., currently at sybooks.sybase.com/). The disclosures of the foregoing are hereby incorporated by reference.

The above-described computer hardware and software are presented for purposes of illustrating the basic underlying desktop and server computer components that may be employed for implementing the present invention. The present invention, however, is not limited to any particular environment or device configuration. Instead, the present invention may be implemented in any type of system architecture or processing environment capable of supporting the methodologies of the present invention presented in detail below.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from Database Server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the Database Server system 240. The engine 260 itself comprises a parser 261, a normalizer 263, a compiler 265, an execution unit 269, and access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

Enhancements to the database manager system 240 which extend this model to create in-memory databases (IMBDs) entirely on in-memory devices created on in-memory storage caches are described in U.S. patent application Ser. No. 12/726,063, filed Mar. 17, 2010, and entitled "MANAGING DATA STORAGE AS AN IN-MEMORY DATABASE IN A DATABASE MANAGEMENT SYSTEM", and assigned to the assignee of the present invention, the disclosure of which is incorporated herein in its entirety. In general, database fragments for the data and log segments are able to be defined on one or more in-memory devices, which then creates an entirely in-memory database with zero-disk footprint. Such databases provide full run-time transactional support with no I/O to disk.

An aspect of operation that requires special consideration for in-memory databases is database back-up operation. In the current DUMP/LOAD model for disk-based databases, dumps are done directly from the database device to the archive device(s) and loads are done from the archive device(s) to the database devices. For an IMDB, as there are physically no devices, this paradigm is changed in a way that still offers to users some periodic persistence of active work to an archive.

A description of a known disk-based backup procedure is provided in the aforementioned U.S. Pat. No. 5,671,350. Portions of that patent are included for reference in conjunction with FIGS. 3 and 4. In general, in order to create a recoverable dump, some sort of synchronization protocol needs to be implemented to coordinate a Database Server and a Backup Server. This is achieved typically through phases and a stripe affinity mechanism.

Figure 3:
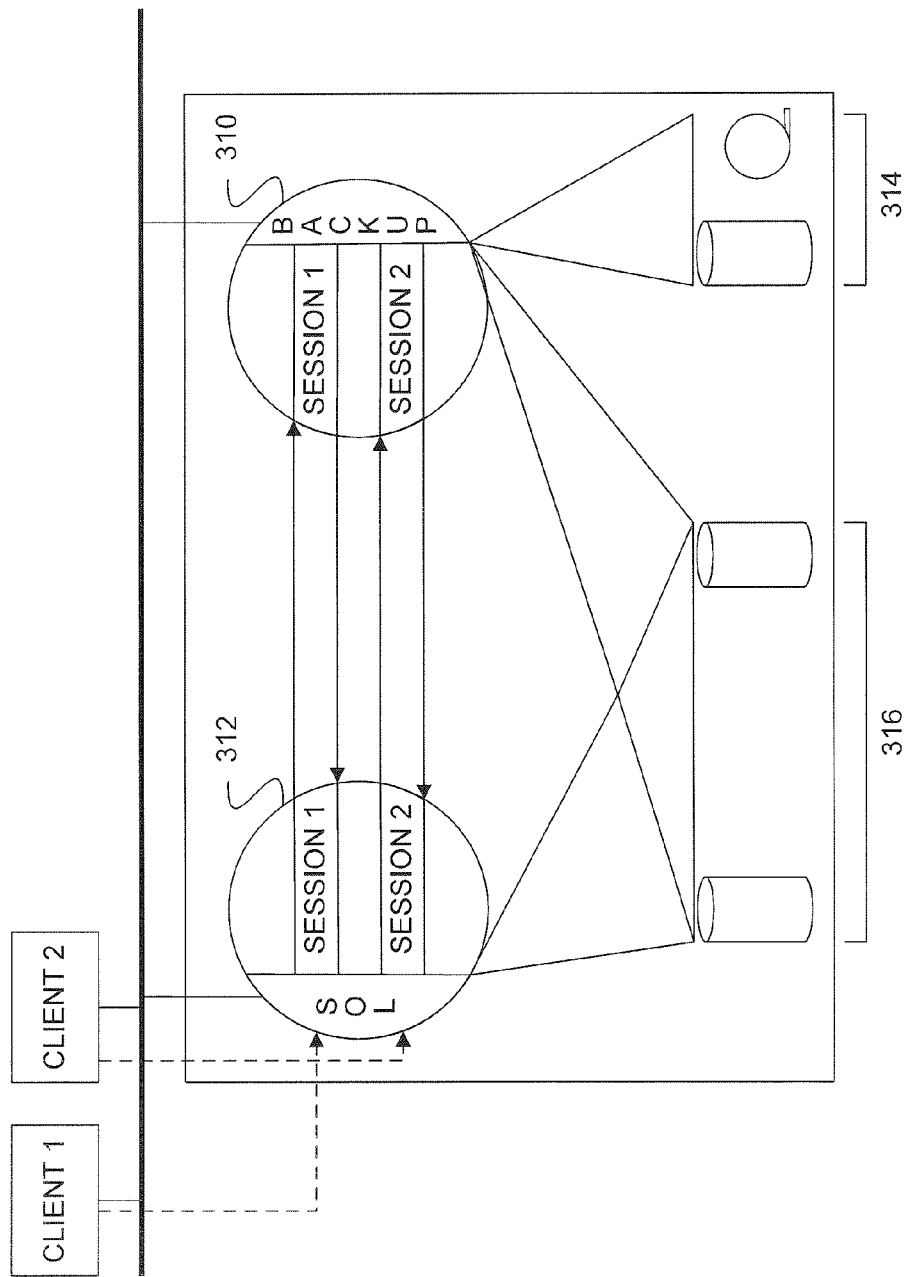
FIG. 3 illustrates a typical operating environment for a Database Server and Backup Server in a disk-based database system.

Referring first to FIG. 3, a typical operating environment for a Database Server and Backup Server in a disk-based database system is shown. For purposes of this description, it is assumed that the database engine or server is an ASE Server, such as the type currently available from Sybase Inc. of Dublin, Calif. However, the architecture of the data backup system may be applied to any suitable transactional database or transactional file system that requires the benefits provided by the approach. The backup system coordinates the transfer of information between a Backup Server 310 and a Database Server 312 to produce a recoverable database dump using a special dump synchronization protocol. The dump synchronization protocol may run on a controller (not shown) and control the operation of both the Backup Server and the Database Server. The controller may also be integrated into the architecture of the Backup Server 310, the Database Server 312 or both.

In the typical backup process, both the Backup Server 310 and the Database Server 312 have access to database devices 316. In addition, the Backup Server 310 can address multiple archive devices 314.

The dump synchronization protocol ensures recoverability of archived data by organizing the dump operation from the Database Server 312 to the Backup Server 310 into a set of Phases. In addition, through the use of a number of phase options, the Backup Server 310 is capable of determining the best strategy and order for moving database pages stored on Database Device 316 from the SQL Server 312 to the Backup Server 310 in order to expeditiously and efficiently archive the contents of the database.

Since one of the strategies for increasing the performance of the backup system is to enable unsynchronized database dumps, it is preferable that once a dump is initiated the Backup Server 310 and the Database Server 312 perform only minimal or no synchronization of access to those database pages on the target database device 316 which are to be backed up.

Figure 4:
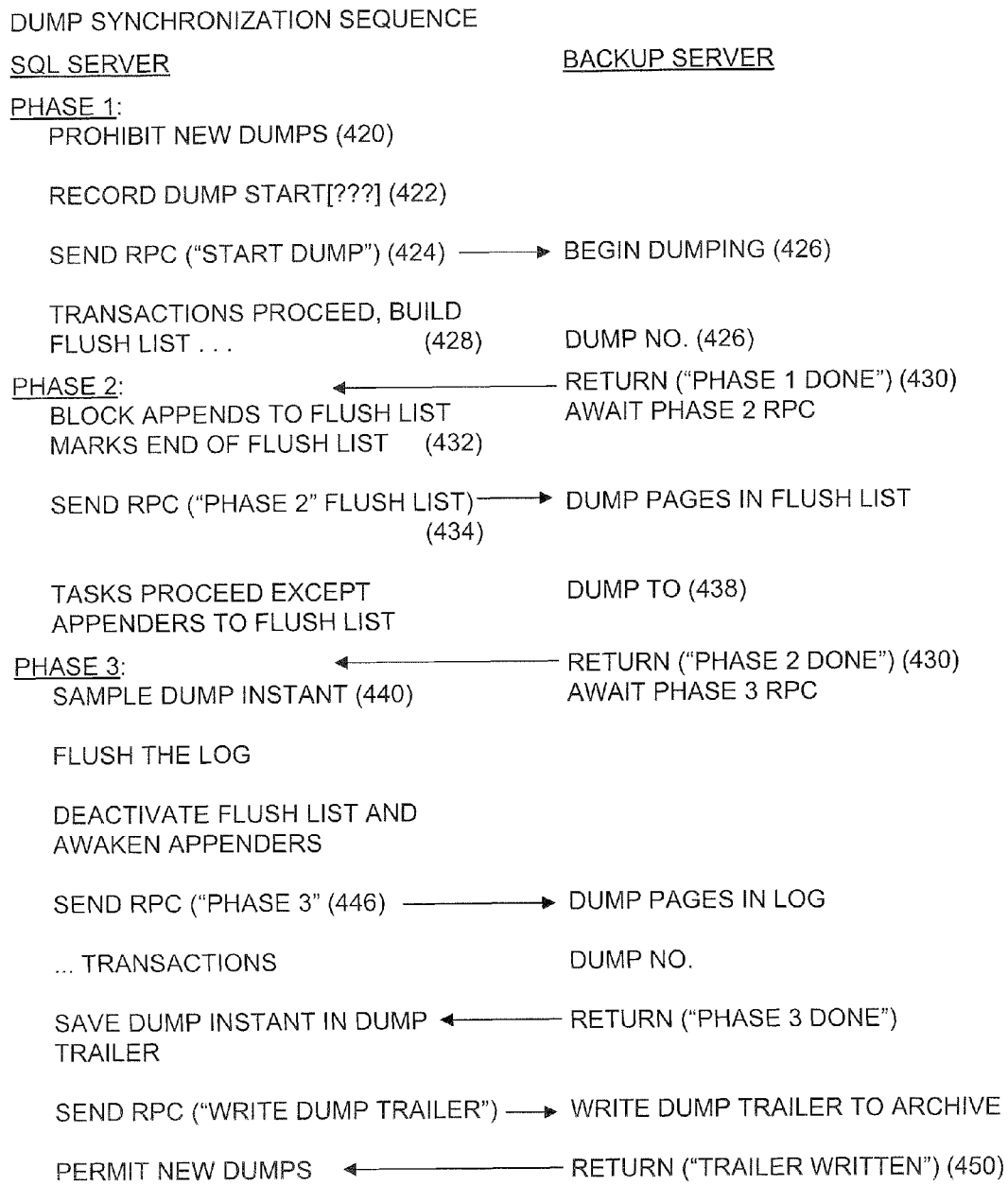
FIG. 4 illustrates a basic synchronization scheme used in the typical database dump.

Referring next to FIG. 4, the basic synchronization scheme used in the typical database dump is shown. As can be seen, dumps are ordered into phases. In Phase 1, a user initiates a request to dump an image of the database to an archive device. The Database Server blocks the initiation of any other dumps of the target database 420 and records a dump start RID 422. After recording the dump start RID, the Database Server signals the Backup Server to begin dumping 424. At this point, the Backup Server begins its dump utilizing the fully available I/O bandwidth. A flush list 428 is also built at this point, When this initial Phase 1 dump is completed, the Backup Server signals the Database Server that Phase 1 of the dump is completed 430 thereby creating a baseline dump of all the pages that will need to be recorded in the backup database.

It should be noted that the backup system is especially well suited to operation in a transactional database environment where it is necessary to update database pages which have already been backed up during some part of Phase 1, but which may have then changed without a corresponding log record, while another part of the Phase 1 backup was in effect. This rewriting of information takes place during Phase 2 during which pages that have been changed without logging since the time the dump started are dumped again. As noted, it is necessary to dump these pages again because an allocation to a transaction tracking log or a page split that takes place during Phase 1, but after the corresponding allocation unit has been dumped, would not otherwise be recoverable. Under this architecture, it is sufficient to re-dump only those pages that have changed, because those pages will contain information created later in time and will therefore overwrite any earlier recorded data with more current data during a restoration session. A useful way to perform this task without limiting the throughput during Phase 2 is to keep track of all physical changes made to the database that cannot be completely recovered from log information. These physical changes include, but are not limited to, page splits from B-tree index updates and new pages generated by index creation. During Phase 1, the Database Server will maintain a list of pages allocated for these purposes, and this list is known as a flush list 428.

As can be seen in FIG. 4, at the beginning of Phase 2, the Database Server blocks any tasks attempting to add to the flush list before they issue the corresponding log records 432. The preferred order is to (1) log the change; (2) flush the page; and (3) add the page number to the flush list. This is necessary since, without such blocking, those log records could not be redone. The Database Server then determines an end point for the flush list and sends it to the Backup Server 434 while awaiting acknowledgement from the Backup Server that pages in the flush list have been dumped. The Backup Server then dumps those pages 436 and returns a completion message to the Database Server 438 indicating that Phase 2 has been completed.

Turning next to Phase 3, as can be seen in FIG. 4, the Database Server handles all the log pages that have been allocated since the start of Phase 1. The records all fall between the dump start RID and the current last record of the log. All other allocations and data are recoverable from this log. The Database Server captures the current last record of the log 440 (called the dump instant) and constructs a list of all log pages between the dump start RID and the dump instant. It ensures that all those pages have been written to the database and then sends a list of log pages to the Backup Server for dumping 446. Finally, the flush list is discarded and deactivated which has the effect of reactivating tasks waiting on the flush list. When the Backup Server signals the end of Phase 3, the Database Server permits new dumps once again 450.

It is noted that the incorporation of three (3) phases is not critical, and, at a minimum only Phase 1 (the data phase) and Phase 3 (the log phase) are required. For example, in a transactional data repository system, such as a database or transactional file system, it is only necessary to perform an unsynchronized copy of the repository in Phase 1, followed by a synchronized copy of the transaction log in Phase 3 (which would be the second actual phase in this example). As noted, the function of a later phase is to capture recovery information for all the changes that have occurred during or subsequent to an initial phase but prior to a secondary phase. In an implementation, it is necessary to have a Phase 2 for flushed pages due to the particular Database Server design. However, this flushed page concept may not exist in other embodiments and, consequently, a data phase and a log phase alone will suffice.

The dump functionality allows for the archive data to be read or written to multiple devices simultaneously with the database divided into multiple pieces, each separate piece directed to a unique archive device. This division of the database into multiple archive devices is referred to as striping. The association of a single piece of the database to its corresponding archive device is referred to as a stripe. When Backup Server receives a dump/load request with multiple stripes, the client task spawns a separate I/O service task (Open Server thread) for each stripe. Each I/O service task is responsible for the transfer of data between the database and archive devices for that piece of the database.

Depending upon which piece of the database is to be dumped to a particular stripe, runlists are associated to a stripe. At dump time, the stripe's service I/O task has a group of runlists whose database pages will be dumped to the archive device. A service UO task processes one runlist at a time. Once all of the runlists for a stripe have been dumped, the service I/O task terminates.

Figure 5:
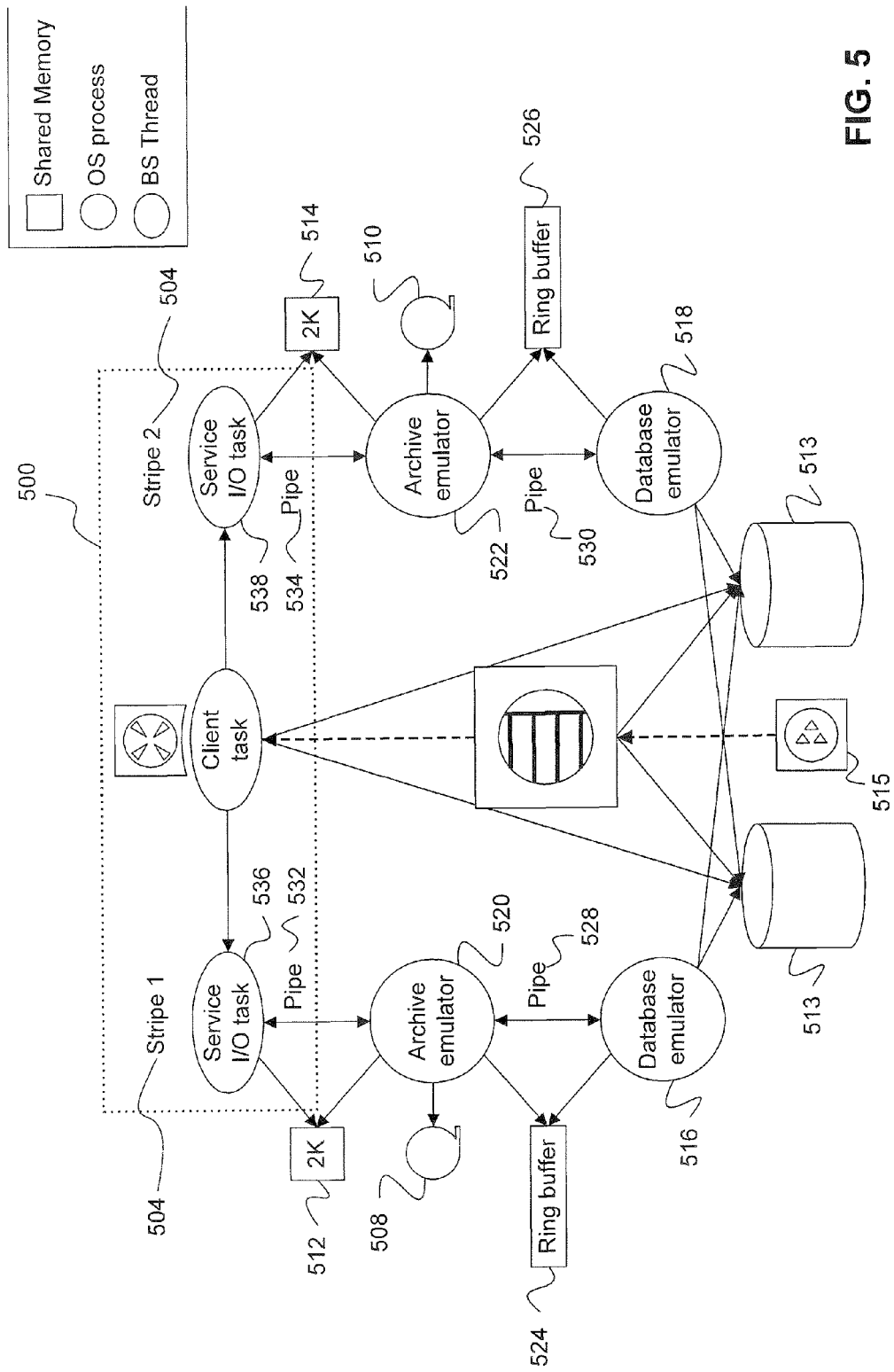
FIG. 5 illustrates a schema of the interaction between a Backup Server, using two stripes, and a Database Server for a disk-resident database DUMP/LOAD model.
Figure 6:
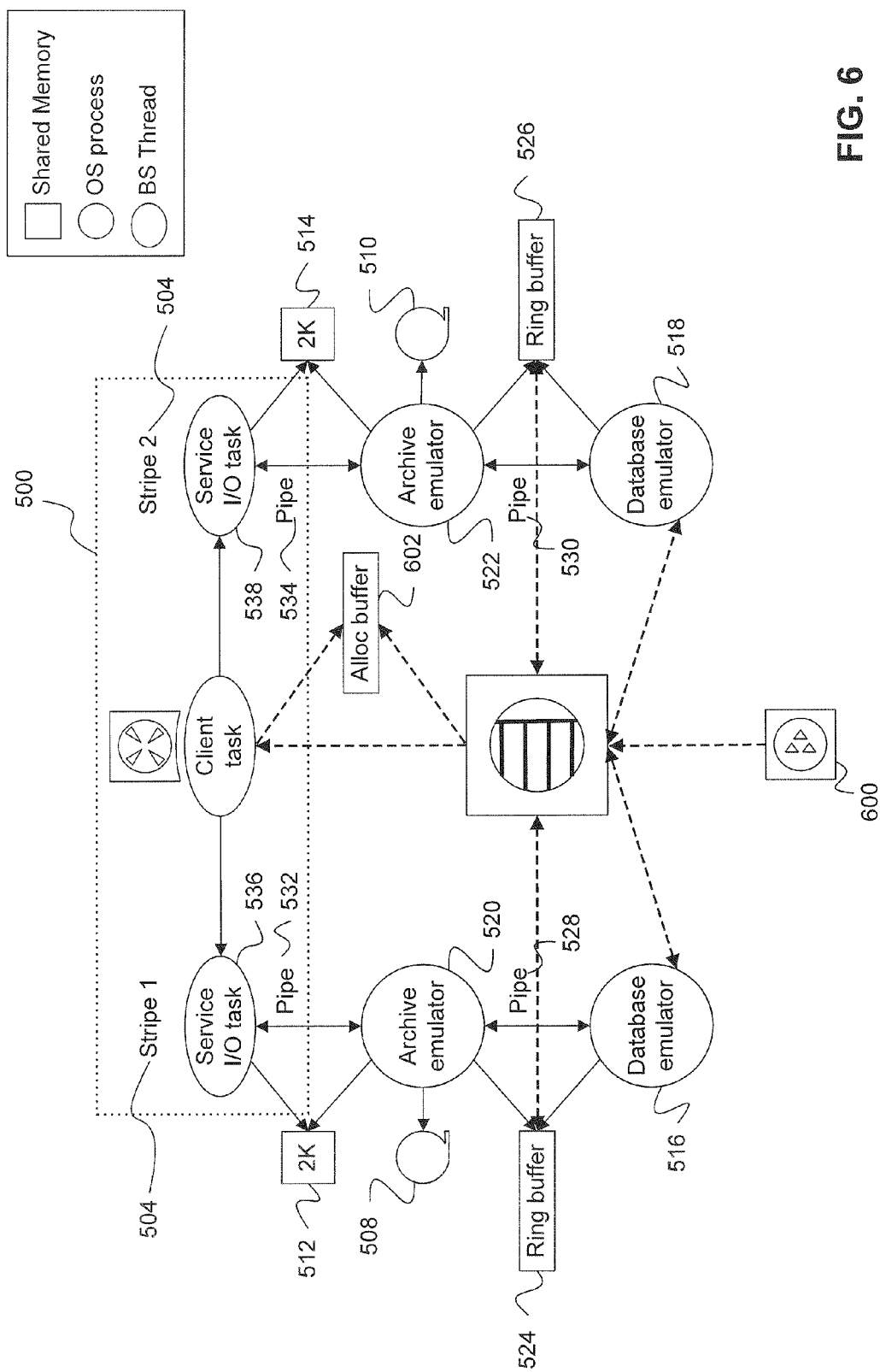
FIG. 6 illustrates a schema of the interaction between a Backup Server, using two stripes, and a Database Server for a DUMP/LOAD model for an in-memory database in accordance with embodiments of the present invention.

In order to illustrate how the approach for disk-based database backup differs from that for in-memory database backup in accordance with the invention, schemas of the interaction between a Backup Server and a Database Server for the DUMP/LOAD model for each type of backup are presented with reference to FIG. 5 and FIG. 6, respectively. As will be described, the entire Backup Server architecture remains substantially identical with the exception of the routines required to open, read, write and close the devices.

Referring now to FIG. 5, a schema of the interaction between a Backup Server 500, using two stripes 502, 504, and a Database Server 506 (e.g., ASE) is shown for a DUMP/LOAD model for a disk-resident database. In order to create a recoverable dump, a synchronization protocol is implemented to coordinate the Database Server 506 and Backup Server 500. This is achieved through phases and a stripe affinity mechanism, as described above.

Information about each runlist is dumped to the archive devices 508, 510. In a normal disk-resident 511, 513 database 515, the Backup Server 500 allocates its own set of local 2K buffers 512, 514 for this phase, one per allocation page (where 2K is considered enough even for 16K servers, as the extents in an allocation page fit in 2K, as is well understood in the art). Backup Server 500 also spawns emulators per stripe (assuming a local dump; a remote dump only needs a single emulator). These are database emulators 516, 518 and archive emulators 520, 522.

During a dump operation, the database emulators 516, 518 read database pages into one of the shared memory buffers 524, 526. During a load operation, database pages are written from one of the buffers 524, 526. The archive emulators 520, 522 interact with the archive devices 508, 510. During a dump operation, pages are written to the archive devices 508, 510 from one of the shared memory buffers 524, 526. During a load operation, data pages are read from an archive device 508, 510 into shared memory buffers 524, 526. The emulators communicate with each other via pipes 528, 530. The pipe is used to synchronize I/O operations. The archive emulators 520, 522 communicate with Backup Server 500 via another set of pipes 532, 534, also referred to as the job queue. The I/O service tasks 536, 538 issue jobs to the archive emulators 520, 522 by placing the job request in the pipes 532, 534. The archive emulators 520, 522 acknowledge the results of that request through the same pipes 532, 534.

In addition, a shared memory segment is shared between Backup Server and the emulators. This shared buffer is used to hold label blocks for when header/trailer labels are read or written to the archive device. If an emulator receives a job request to transfer multiple buffers worth of data between the database and archive devices, the following procedure occurs.

The emulator that is reading from a device will continue to read data and fill up a buffer as long as there are available buffers. After each buffer is full, the reader emulator will send a message, via the pipe, to the other emulator. Upon receipt of this message, the write emulator will write the data from the buffer to a device. Upon completion of the write, the writer emulator will send a completion message, via the pipe, back to the reader emulator. As long as there are unused buffers and there is more data to be read from a device, the reader emulator will read the data and fill a buffer. Once there are no more available buffers, the reader emulator will wait until it receives a message, via the pipe that a buffer is available.

In the above description, the identity of the reader and write emulators depends upon the type of operation. For a dump operation, the reader emulator is the database emulator and the writer emulator is the archive emulator. For a load operation, the reader emulator is the archive emulator and the writer emulator is the database emulator.

Referring now to FIG. 6, a schema of the interaction between a Backup Server, using two stripes, and a Database Server (e.g., ASE) is shown for the DUMP/LOAD model of an in-memory database 600 in accordance with an embodiment of the invention.

For in-memory database 600, Backup Server 500 allocates buffers 602 in shared memory, so that Database Server 506 is able to make use of these buffers 602, as well. In operation, rather than Backup Server 500 reading the allocation information into its own local buffers 512, 514, Database Server 506 is instructed to copy the requisite information into the shared buffers 602. To do this, a ct-library connection with Database Server 506 is opened and an RPC request is sent asking Database Server 506 to attach to that memory region. This connection is the only connection the Backup Server 500 opens with Database Server 506, and the Database Server 506 thread it spawns remains active while the DUMP is active. This thread in Database Server 506 attends to requests from the Backup Server 506. The requests include a request to attach to the shared memory 602 holding the buffers to store the allocation pages, a request to read allocation pages, for which the Backup Server 500 sends an RPC with the logical page number, the database id, the ID of the shared memory, and the offset within the shared memory to copy the page to, and a request to detach from the shared memory.

For in-memory database 600, the database emulators 516, 518 do not read the pages directly. Instead, when the database emulators 516, 518 start up, another ct-library connection is opened with Database Server 506 and stays open while the dump happens. As in the case of the connection already opened by the Backup Server 500, the thread in Database Server 506 attends to RPC requests from the database emulators 516, 518, similar to the requests that are made of it by Backup Server 500, with the sending of an RPC to Database Server 506 with the starting logical page number, the number of pages to read, the ID of the shared memory (ring buffers 524, 526) and an offset within the ring buffers 524, 526 to place the pages. This offset is the same negotiated offset between the database 516, 518 and archive emulators 520, 522. The Database Server 506 copies the requested pages into the ring buffers 524, 526 after which the database emulators 516, 518 notify the archive emulators 520, 522 that the pages are available for copying to the archive device 508, 510. Thus, the result is the same as that for the disk-resident database.

At LOAD time, there is no need to build runlists from the allocation pages. The shared memory 602 that stores the allocation pages is not needed, and there is no connection to the Database Server 506 from the Backup Server 500. The entire job is done between the archives 520, 522 and the database emulators 516, 518. The database emulators 516, 518 have a set of pages in the ring buffers 524, 526 to be written. Instead of writing them, it sends RPCs to Database Server 506 with the starting page number, database ID, ID of the ring buffer and the offset where the first page is located. When Database Server 506 receives the request, it simply reads the pages from the shared memory address and replaces them in the in-memory database cache.

Figure 7:
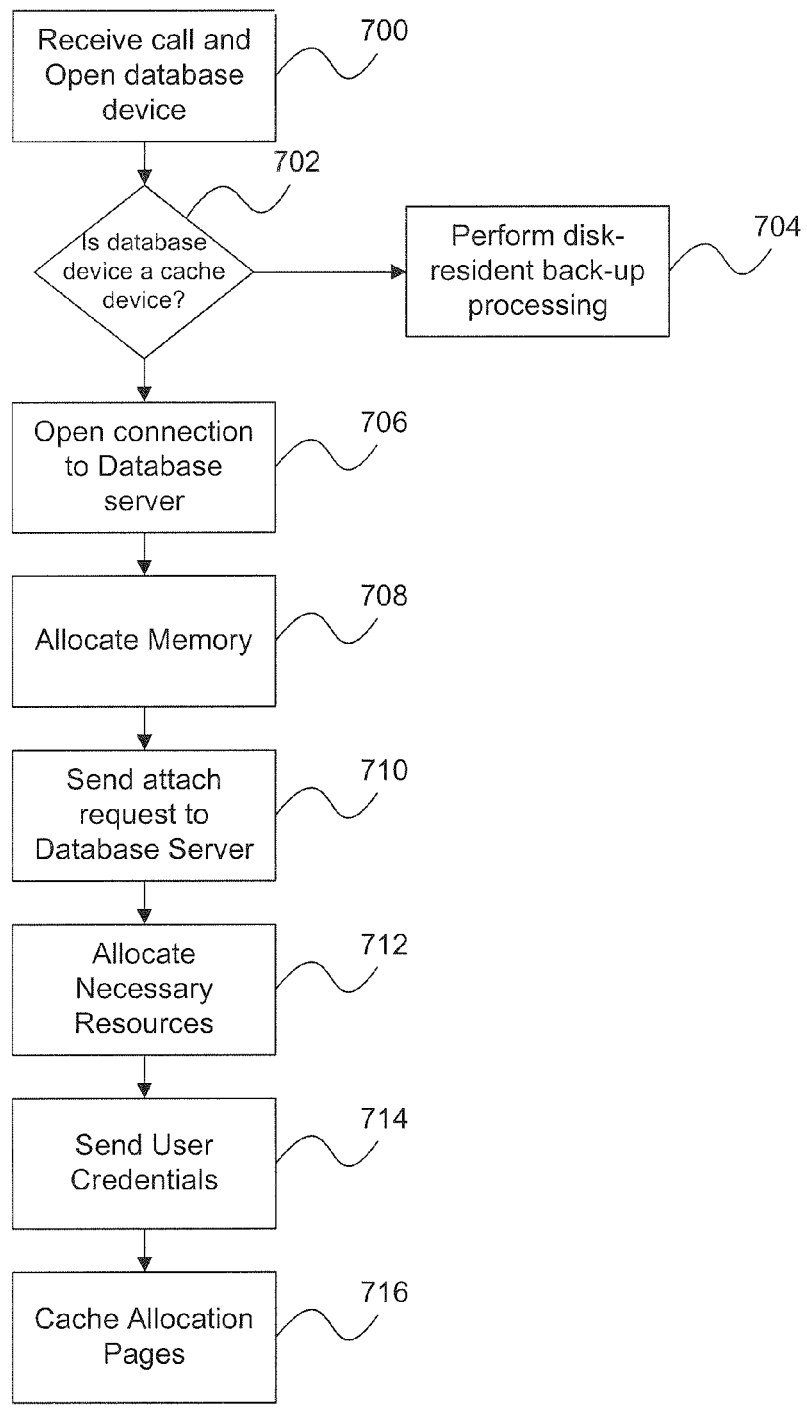
FIG. 7 illustrates a block flow diagram of a process of a DUMP flow in the Backup Server in accordance with an embodiment of the invention.

FIG. 7 illustrates a block flow diagram of a process of a DUMP flow in the Backup Server in accordance with an embodiment of the invention represented by FIG. 6. The process initiates (block 700) when the Backup Server receives a RPC (e.g., bs_write_header) and opens all the database devices. When the database device is a disk-resident device (as determined via block 702), the back-up proceeds according to known, standard back-up processing (block 704), as described herein.

When the database device is found to be a cache device (block 702 is affirmative), the open call becomes a call to the Database Server to open (e.g., ase_open( )), which will open a ct-library connection with the Database Server (block 706) using the credentials of the user who is executing the DUMP command. These credentials include the Database Server name, the user name and password, the interfaces file used by the Backup Server, and the localization information used by the Backup Server. These credentials may be provided via suitable system auxiliary task data. It is appreciated that the Database Server does not always have access to the user plaintext password and the username is not always the actual name used to login to the Database Server. If the connection is established using secure external authentication (such as Kerberos), Backup Server may not be able to retrieve the password token from the Database Server and a stored procedure for remote login may be needed to define a trusted remote login, or alternatively, the Backup Server may receive an authentication failure.

As soon as it opens the database devices, the Backup Server allocates a memory fragment (block 708) to cache as many allocation pages as it can, based on the database IO size, and this allocated region is placed in shared memory. The Backup Server then sends an attach request (block 710) to the Database Server (e.g., ase_shmattach( )), so that the Database Server attaches to the allocated region using the previously opened connection.

The Backup Server further spawns the processes to allocate the necessary resources (block 712), like the ring buffer, that is the shared memory location used to exchange information between the archive and the database emulators. Once the emulators have started, the Backup Server sends the user credentials (block 714) to the archive emulator, who will pass it on to the database emulator. Allocation pages are then cached (block 716) using the ring buffer, with the Backup Server reading the different allocation pages, creating an affinity map, building the runlists of allocated pages and delivering a request to write these pages to the different stripes, e.g., by calling ase_read_write( ).

This is the only access to database pages by the Backup Server itself. The database access from now on happens in the emulators.

Database Access at the Emulator

Figure 8:
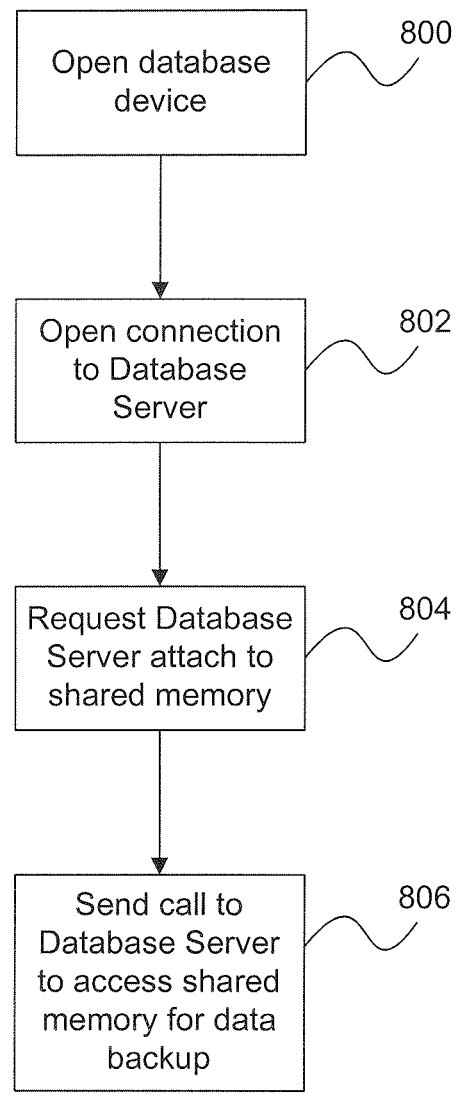
FIG. 8 illustrates a block flow diagram of a process for accessing data at the emulator in accordance with an embodiment of the present invention.

Referring now to FIG. 8, a block flow diagram of a process for accessing data at the emulator in accordance with an embodiment of the present invention is illustrated. The emulator starts by opening all the database devices (block 800), where all the in-memory devices share the same handle, and as in the case of the Backup Server, this handle is obtained by calling the Database Server, e.g., via ase_open( ), (block 802). When the Database Server connection is set-up, the emulator requests that the Database Server attach to the ring buffer (e.g., via ase_shmattach( )), (block 804) that is the shared memory area between the reader and the writer emulators, which is now shared also by Database Server. In contrast to when the emulator accesses disk-resident database page by using the physical address of the page, for in-memory database, the emulator uses the logical page number. The emulator then sends a call (block 806) to the Database Server to read from or write to the ring buffer (e.g., via ase_read_write( )), according to whether the action is a load or a dump, respectively.

Through the aspects of the invention, the I/O to in-memory database devices has been setup at a very low level. The entire Backup Server architecture remains substantially identical with the exception of the routines required to open, read, write and close the devices. The Backup Server and DBMS DUMP/LOAD commands are enhanced to archive an in-memory database entirely from memory to an archive device, and then to load such archives directly into memory, bypassing the DBMS devices entirely. This feature is practically transparent to users. DUMP consumes as many user connections as stripes plus one, while LOAD uses as many as stripes, one less, because it does not have to read allocation pages, as is well appreciated by those skilled in the art. Of course, in order to avoid running out of user connections, the user can restrict the number of user connections consumed for dump and load, such as by specifying the number of backup connections through a configuration procedure, e.g., sp_configure 'number of backup connections', n.

Further, the current Backup Server architecture is kept as modular and stable as it was prior to the existence of in-memory databases, with the changes being applied at the access layer and only the very low level routines that physically access the data pages know that the backup is with in-memory databases instead of physical devices. It should be appreciated that in the described embodiment there must be a Backup Server running in the same host as the Database Server process, because there is a communication established using shared memory. Further, both reading and writing database pages, although done as a fast in-memory operation, are done one page at a time.

While the invention is described in some detail with specific reference to a preferred embodiment and certain alternatives, there is no intent to limit the invention to that particular embodiment or those specific alternatives. Further, the description presents methods that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). Those skilled in the art will appreciate that modifications may be made to the preferred embodiment without departing from the teachings of the present invention.

What is claimed is:

1. A computer-implemented method for backing up an in-memory database, comprising:
   accessing a backup server configured to perform backup operations on a database on behalf of a database server;
   determining whether the database is an in-memory database;
   utilizing database server connections to shared memory accessible to the backup server and the database server during data accesses via logical page addressing for the backup operations, when it is determined that the database is an in-memory database; and
   utilizing backup server connections during data accesses via physical page addressing for the backup operations, when it is determined that the database is other than an in-memory database.

2. The method of claim 1, further comprising:
   allocating shared memory accessible to the backup server and the database server.

3. The method of claim 2, further comprising:
   instructing the database server to attach to the shared memory, read allocation pages into the shared memory, and detach from the shared memory for a data dump backup operation.

4. The method of claim 2, further comprising:
   instructing the database server to attach to the shared memory, read allocation pages from the shared memory and detach from the shared memory for a data load backup operation.

5. The method of claim 1, further comprising:
   providing a database emulator and an archive emulator that utilize remote procedure calls to the database server during data transfers for the backup operations.

6. A system for backing up an in-memory database, comprising:
   a database server including memory for temporarily storing data objects, wherein the database server is implemented by one or more processor based computing devices; and
   a backup server configured to perform backup operations on a database on behalf of the database server, wherein backup server connections are utilized during data accesses via physical page addressing for the backup operations when it is determined that the database is other than an in-memory database, and wherein database server connections to shared memory accessible to the backup server and the database server are utilized during data accesses via logical page addressing for the backup operations, when it is determined that the database is an in-memory database.

7. The system of claim 6, wherein the database server attaches to the shared memory, reads allocation pages into the shared memory, and detaches from the shared memory for a data dump backup operation.

8. The system of claim 6, wherein the database server attaches to the shared memory, reads allocation pages from the shared memory and detaches from the shared memory for a data load backup operation.

9. The system of claim 6, further comprising a database emulator and an archive emulator configured to utilize remote procedure calls to the database server during data transfers for the backup operations.

10. A non-transitory computer-readable medium having instructions stored thereon, that when executed by a processor, cause the processor to perform operations for backing up an in-memory database in a database management system, the operations comprising:
    accessing a backup server to perform backup operations on a database on behalf of a database server;
    determining whether the database is an in-memory database;
    utilizing database server connections to shared memory accessible to the backup server and the database server during data accesses via logical page addressing for the backup operations when the database is an in-memory database; and utilizing backup server connections during data accesses via physical page addressing for the backup operations, when it is determined that the database is other than an in-memory database.

11. The non-transitory computer-readable medium of claim 10, further comprising:

allocating shared memory accessible to the backup server and the database server.

12. The non-transitory computer-readable medium of claim 11, further comprising:

instructing the database server to attach to the shared memory, read allocation pages into the shared memory, and detach from the shared memory for a data dump backup operation.

13. The non-transitory computer-readable medium of claim 11, further comprising:

instructing the database server to attach to the shared memory, read allocation pages from the shared memory and detach from the shared memory for a data load backup operation.

14. The non-transitory computer-readable medium of claim 10, further comprising:

providing a database emulator and an archive emulator that utilize remote procedure calls to the database server during data transfers for the backup operations.

* * * * *